Jan. 18, 1927.  
W. I. WHEELER  
POWER TRANSMISSION MECHANISM  
Original Filed Jan. 2, 1923  4 Sheets-Sheet 1  
1,614,637
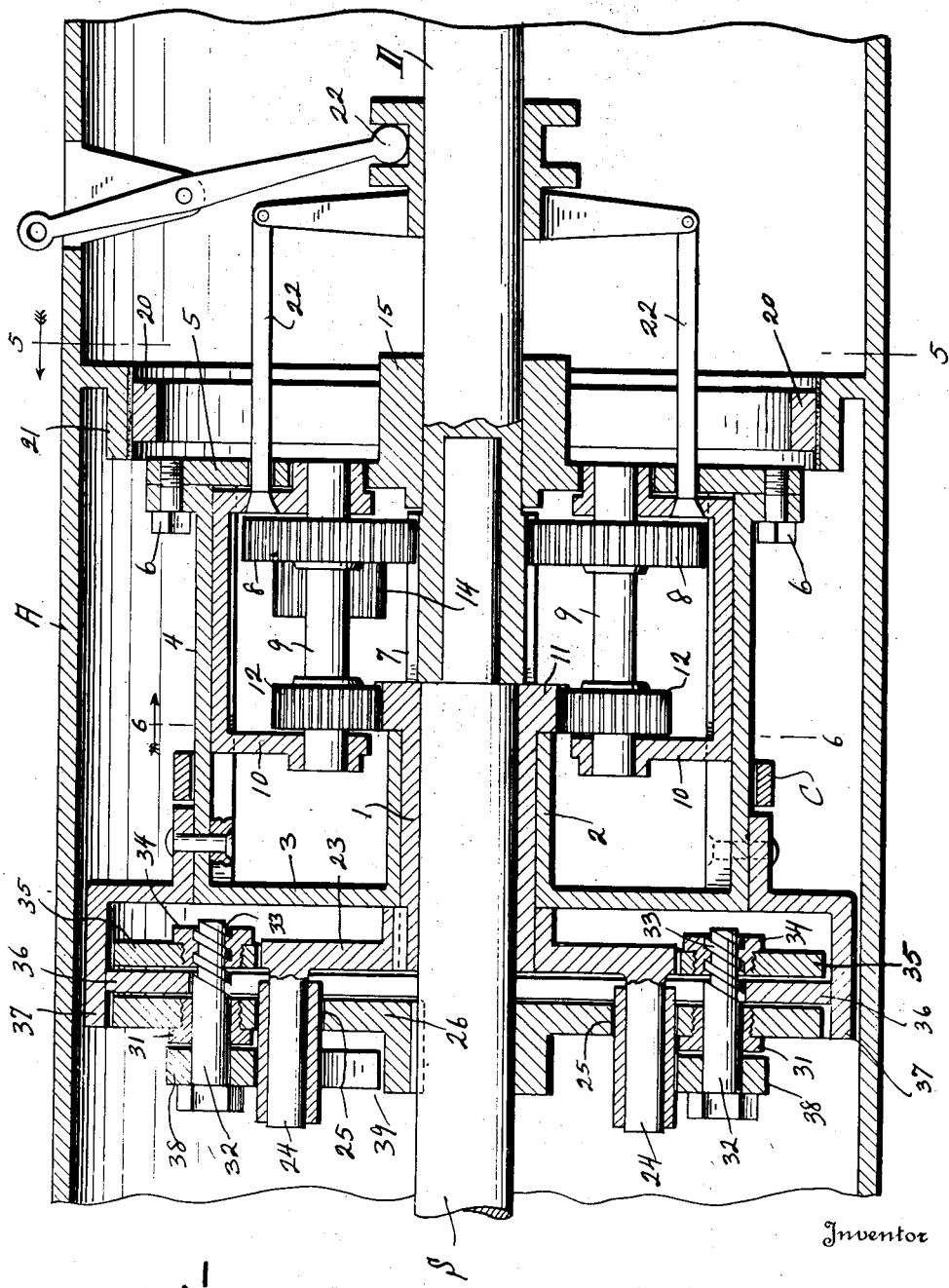
Inventor  
W.I.Wheeler  
By Watson E. Coleman  
Attorney

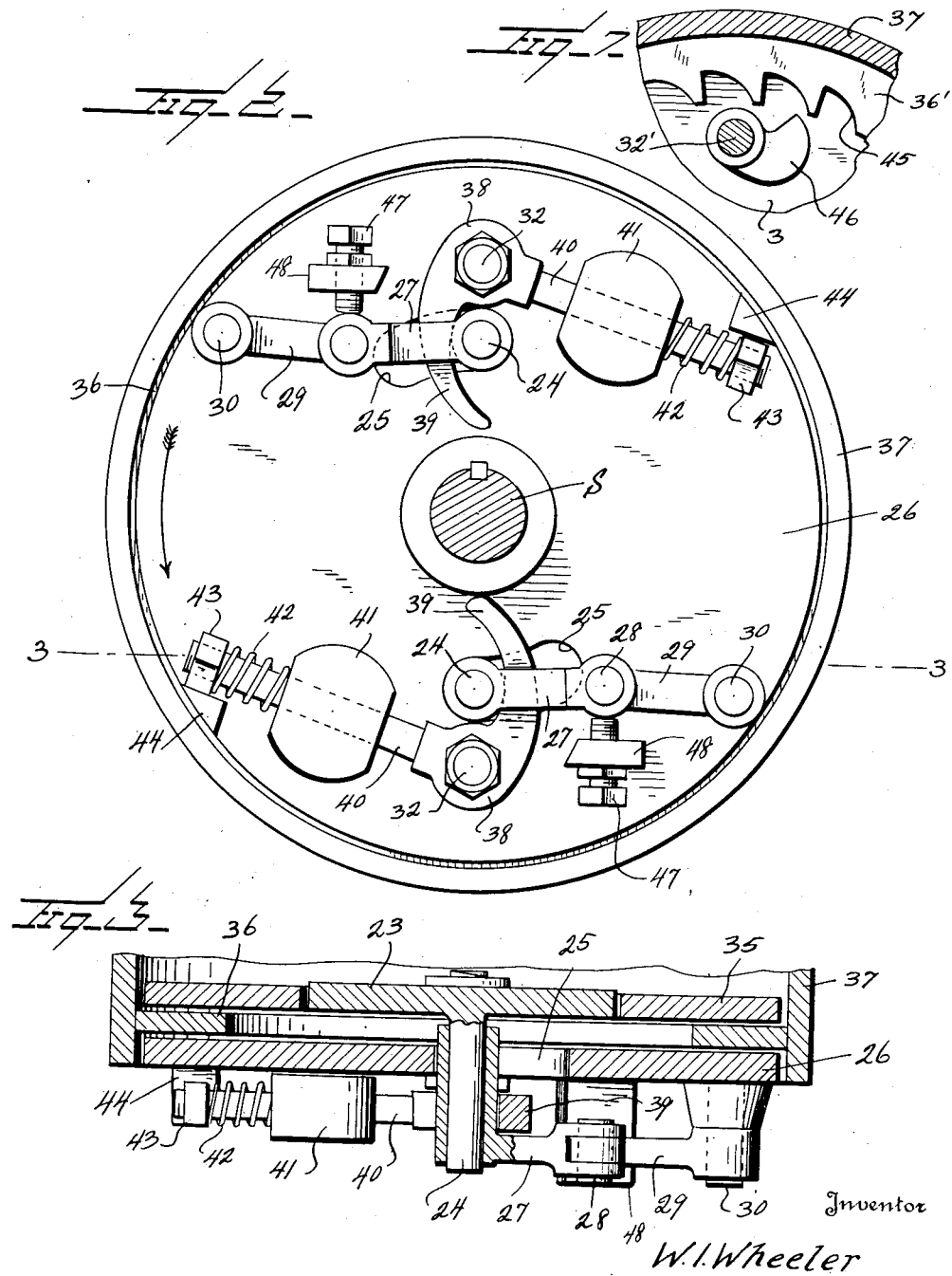

Jan. 18, 1927.
W. I. WHEELER
1,614,637
POWER TRANSMISSION MECHANISM
Original Filed Jan. 2, 1923    4 Sheets-Sheet 3
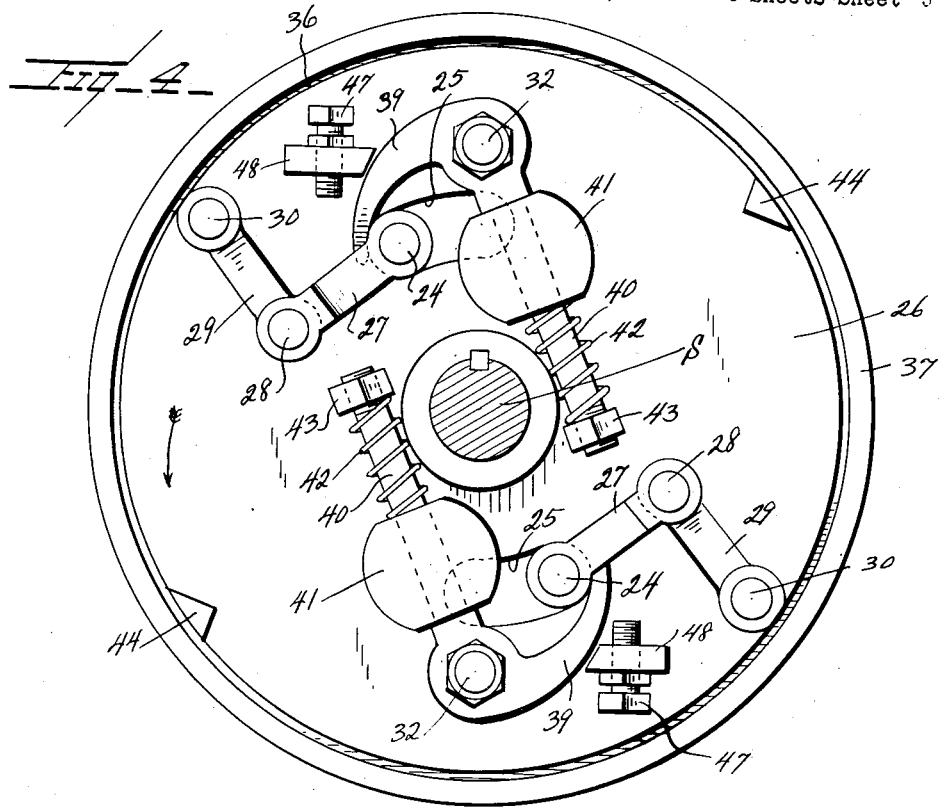
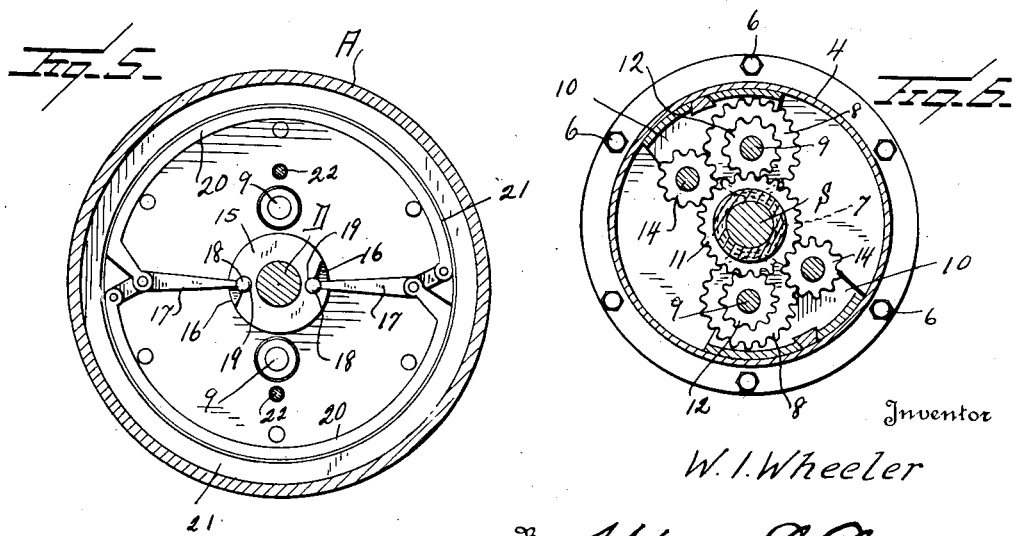
Inventor
W. I. Wheeler
By Watson E. Coleman
Attorney Jan. 18, 1927. 1,614,637
W. I. WHEELER
POWER TRANSMISSION MECHANISM
Original Filed Jan. 2, 1923 4 Sheets-Sheet 4
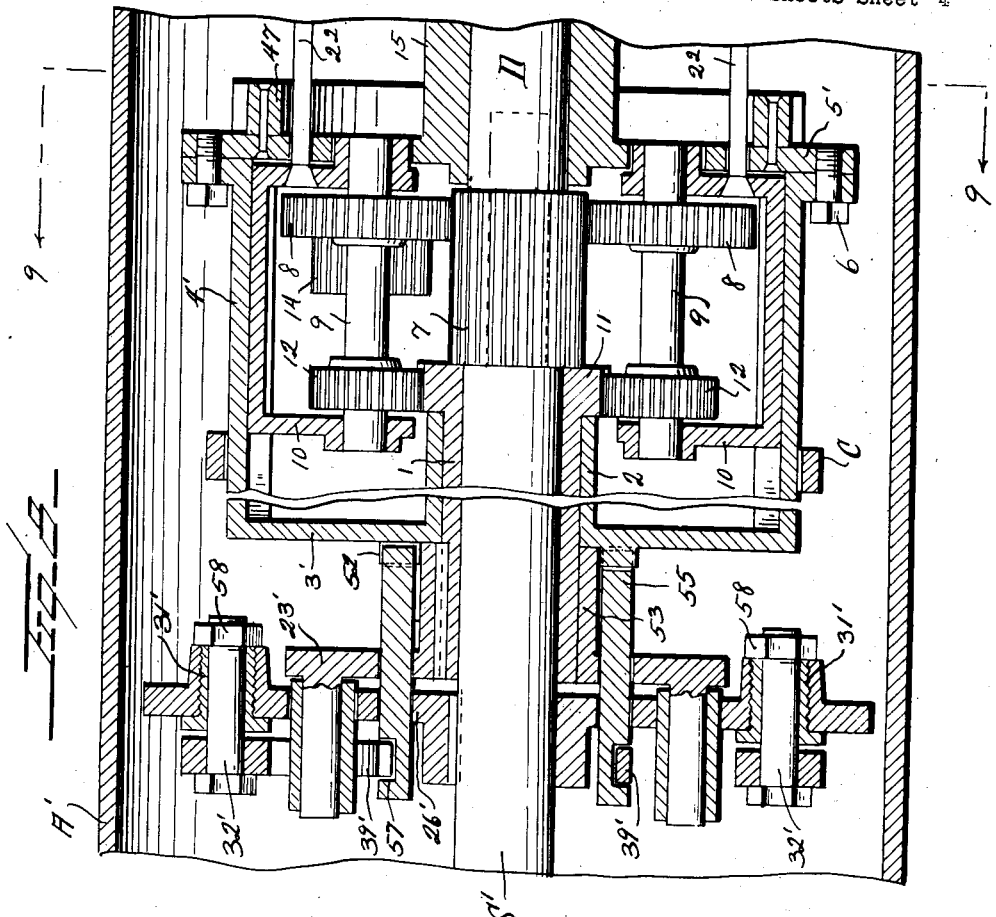
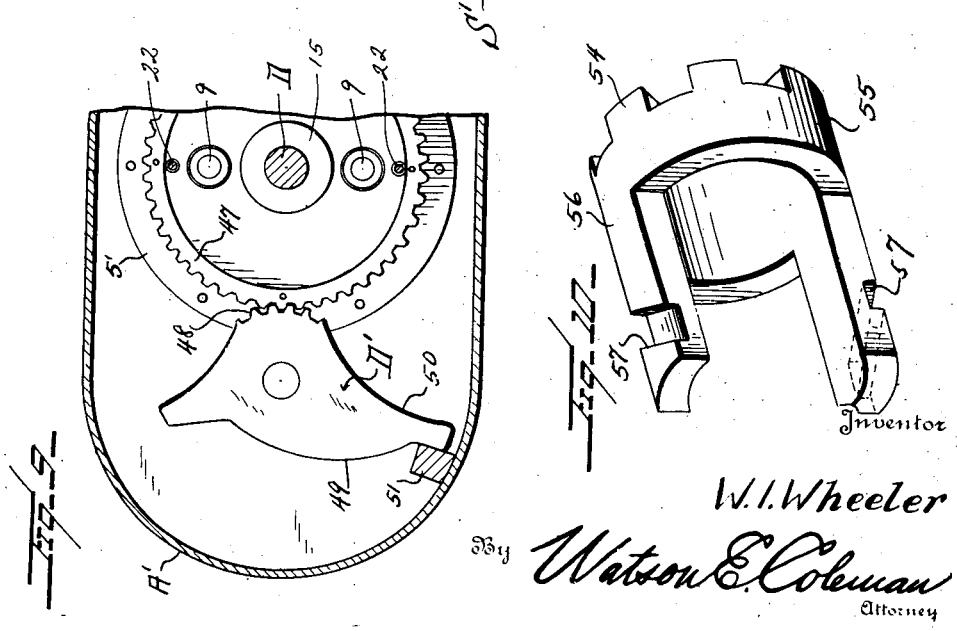
Inventor
W. I. Wheeler
By Watson E. Coleman
Attorney Patented Jan. 18, 1927.

1,614,637

UNITED STATES PATENT OFFICE.

WILLIAM ISIAH WHEELER, OF SCOTTVILLE, ILLINOIS.

POWER-TRANSMISSION MECHANISM.

Application filed January 2, 1923, Serial No. 610,249. Renewed August 24, 1926.

This invention relates to certain improvements in power transmission mecahnisms and it is an object of the invention to provide a novel and improved mechanism of this general character wherein the speed of the driven shaft with respect to the driving shaft is automatically controlled and particularly in accordance with the engine load.

Another object of the invention is to provide a novel and improved mechanism of this general character embodying driving and driven shafts together with a clutching means rotating with one of said shafts and operating automatically to control the speed of the driven shaft with respect to the driving shaft.

Another object of the invention is to provide a novel and improved device of this general character embodying an operative connection between driving and driven shafts including a member loosely mounted on the shafts, together with means for holding said member against rotation in one direction in unison with the shafts, together with a clutching means rotating with one of said shafts and automatically operating to cause the member to rotate in one direction in unison with the shafts.

The invention consists in the details of construction and in the combination and arrangement of the several parts of my improved power transmission mechanism, whereby certain important advantages are attained and the device rendered simpler, less expensive and otherwise more convenient and advantageous for use, as will be hereinafter more fully set forth;

The novel features of my invention will hereinafter be more definitely claimed.

In order that my invention may be the better understood, I will now proceed to describe the same with reference to the accompanying drawings, wherein:—

Figure 1 is an enlarged fragmentary view partly in section and partly in elevation illustrating a power transmission mechanism constructed in accordance with an embodiment of my invention;

Figure 2 is a view in end elevation of the structure as illustrated in Figure 1;

Figure 3 is a sectional view taken substantially on the line 3—3 of Figure 2;

Figure 4 is a view similar to Figure 2 showing certain of the parts in a second position;

Figure 5 is a sectional view taken substantially on the line 5—5 of Figure 1;

Figure 6 is a sectional view taken substantially on the line 6—6 of Figure 1;

Figure 7 is a fragmentary view partly in elevation and partly in section illustrating a further embodiment of my invention;

Figure 8 is an enlarged fragmentary view partly in section and partly in elevation illustrating a still further embodiment of my invention;

Figure 9 is a fragmentary sectional view on a reduced scale taken substantially on the line 9—9 of Figure 8; and Figure 10 is a view in perspective of the slidable member illustrated in Figure 8 unapplied.

As disclosed in the accompanying drawings, D denotes a drive shaft of the motor supported in a conventional manner within a housing or casing A, the inserted end portion of said shaft being operatively engaged with an inserted end portion of the driven shaft S, said shafts S and D being in longitudinal alignment.

Loosely mounted upon and surrounding the shaft S is an elongated sleeve 1 and mounted upon and surrounding the portion of the sleeve 1 is the hub 2 arranged at the axial center of the plate 3, said plate 3 constituting an end wall of the housing 4. Associated with the housing 4 is a second end plate or head 5 which is removable and held in applied position through the instrumentality of the screws 6 or the like, said plate or head 5 being freely mounted on the shaft D, so that the shafts D and S and the housing 4 are capable of independent rotation or of rotation in unison.

The inserted end of the shaft D is provided with a relatively broad gear 7 and meshing with said gear 7 are diametrically opposed gears 8. Each of the gears 8 is fixed to a shaft 9 rotatably supported by a carriage 10, said carriage being supported by the housing 4 for sliding movement in a direction longitudinally of the shafts D and S. The inner or inserted end of the sleeve 1 is provided with a gear 11 preferably of a greater radius than the gear 7. The gear 11 is in mesh with the gears 12 when the carriages 10 are in one position, said gears 12 being each fixed to a shaft 9. By this means the shaft D is operatively engaged with the sleeve 1 and in a manner whereby the sleeve 1 may be rotated with a speed less than the speed of the shaft D. The various gears just referred to may be of any desired ratio so that the ratio of speed between the driving shaft D and the sleeve 1 may be as preferred.

Each of the carriages 10 is also provided with a relatively broad gear 14 constantly in mesh with a gear 8. But, when the carriages 10 are sufficiently moved in a direction inwardly of the shaft S or the sleeve 1, the gears 12 disengage from the gear 11 and the gears 14 are brought into mesh with the gear 11 resulting in a reverse rotation of the sleeve 1. When this reversing of the direction of rotation of the sleeve 1 is required, a suitable braking means generally indicated at C is employed to positively hold the housing or casing A against rotation. This mechanism C may be any type preferred and is adapted to manually operate from a point exteriorly of the housing or casing A.

The head or plate 5 is provided with a hub 15. The hub is provided in its periphery at diametrically opposed points with the sockets 16 from which extend the links 17. The inner ends of the links are provided with the balls 18 seating in the supplemental sockets 19 so that the links 17 will be carried in a substantially radial position when the hub 15 and the housing 4 rotate in one direction but will be automatically shifted to a position inclined to the radial when the hub 15 is shifted in the opposite direction.

Each of the links 17 is pivotally connected to the adjacent end portions of a friction band or brake section 20 and, as is particularly illustrated in Figure 5, it is to be noted that each of the friction band or brake sections is pivotally connected inwardly of the adjacent end of the second band or brake section and that there is sufficient space between the band or brake section to permit the same to rock. The links 17 operate as toggle links so that when the hub 15 together with the housing 4 is rotated in one direction the band or brake sections 20 will be expanded and when rotated in the opposite direction said band or brake sections will be contracted. When the sections 20 are expanded they frictionally engage the annular flange 21 arranged within the casing or housing A and carried by the wall thereof, said flange 21 being concentric to the hub 15. By this means the housing 4 is free to rotate in one direction with the shafts D and S but is locked against rotation when said shafts are rotated in a reverse direction. I do not wish to be understood as limiting myself to this exact means for locking the housing 4 against rotation in one direction as other means may be employed with equal advantage.

22 denotes an actuating mechanism for the carriages 10 and which mechanism may be operated in any desired manner. I wish it to be understood that I do not desire to limit my present embodiment of my invention to the particular arrangement of gears herein disclosed as any conventional mechanism may be substituted therefor.

The sleeve 1 extends beyond the adjacent plate or head 3 of the housing 4 and keyed or otherwise fixed to the extended portion of said sleeve 1 is a disc or plate 23 provided at diametrically opposed points with the outstanding shafts 24. These shafts 24 extend through arcuate slots 25 of predetermined length, provided in the plate or disc 26 keyed or otherwise fixed to the shaft S.

Pivotally engaged with the shafts 24 is a link 27 also pivotally connected as at 28 to a second link 29, said link 29 being pivotally engaged as at 30 to the plate 26. Disposed through the plate 26 in relatively close proximity to and outwardly of the extremity of the slot 25 is a plug or bushing 31, through which is directed the shank or bolt 32 provided at its inner end portion with the left hand threads 33, said threaded portion being directed through a plug or bushing 34 operatively engaged with the annular member 35 surrounding and concentric to the disc or plate 23. Interposed between the annular member 35 and the marginal portion of the plate 26 and arranged outwardly of the bolts or shanks 32 is an annular member 36 arranged within and carried by the outstanding flange 37 fixed to the adjacent end portion of the housing 4.

Fixed to the outer end portion of each of the bolts or shanks 32 is a head 38 provided with an inwardly directed arcuate arm or bill 39 which operatively engages the adjacent shaft 24 upon swinging or rocking movement of the head 38 in one direction to effect movement of the shaft 24 along the slot 25.

The head 38 is also provided with an elongated rod 40 on which is slidably mounted a weighted member 41. Associated with the member 41 is an expansible member 42 for automatically urging the weighted member 41 inwardly of the rod 40. As herein disclosed the member 42 comprises a coil spring encircling the rod 40 and interposed between the weighted member 41 and a stop member or nut 43 threaded upon the outer extremity of the rod 40.

When the drive shaft D is inactive, the rods 40 and the shafts 24 with their associated parts assume the position illustrated in Figure 4 of the accompanying drawings, and in which position the plate 26 and the annular member 35 are free of the interposed member 36. With the gears 12 meshing with the gear 11, the housing 4, upon rotation of the shaft D is held against rotation by the brake sections 20, whereupon the sleeve 1 together with the plate 23 is caused to rotate. As the plate 23 rotates the shafts 2400 engage or contact with similar ends of the slots 25 comprised in the plate 26 as illustrated in Figure 4, and also contact with the arcuate arms or bills 39, whereby the shaft S is rotated. At this time the housing 4 is caused to rotate at the speed determined by the gears 8, 12 and 11. With the various parts in the positions shown in Figure 4 this essential rotation of the sleeve 1 and the disc 26 also results in the shafts 24 exerting a pressure against the curved arms or bills 39 and thereby increasing the resistance or leverage in opposition to the outward movement of the rods 40 under the action of centrifugal force and thereby effectively preventing the plate 26 and member 35 engaging the member 36 while the shaft S is pulling at a reduction or at a speed lower than direct drive. This condition is maintained until the centrifugal force causes the rods 40 to swing outwardly and pull upon the links 27 and 29 up to a position slightly out of alignment as illustrated in Figure 2. This movement results in sufficient rotation of the bolts or shanks 32 to cause engagement between the plate 26 and the members 35 and 36 and which action is easily accomplished by accelerating the motor sufficient to generate the required momentum and then releasing the acceleration to allow the stress or strain between the gears 7 and 11 to equalize, resulting in the rods 40 taking position under centrifugal force as illustrated in Figure 2, and which limited movement is assured by the stop members or lugs 44 carried by the peripheral portion of the plate 26. Under these conditions the shaft S will be rotating as a unit with the shaft D or direct.

It is also to be understood that the same result occurs by the load or other resistance offered as when ascending a hill or other conditions and in which event the arms or bills 39 under centrifugal force results in the automatic operation of the clutching means by rotation of the shaft S and its parts slightly faster than the shaft D for a distance equal to the length of a slot 25.

When the rods 40 are in their outer position as illustrated in Figure 2, it is to be noted that the shafts 24 offer a shorter leverage or less resistance to the arms or bills 39, thus affording a variable resistance to the tripping or moving of the links 27 and 29 so that upon reduction of speed of the shaft S the plate 26 and the members 35 and 36 will correspondingly disengage and thereby allow the gears to drive the plate 26 and the shaft S at a correspondingly lesser speed.

The extent of straightening movement of each pair of links 27 and 29 is controlled by a screw 47 threaded through an outstanding lug 48 carried by the plate 26 and with which the inner end portion of one of the links, as 27 contacts. The screw 47 is adapted to be adjusted to regulate the extent of straightening movement of the links in order to effect the different tripping or releasing positions as the requirements of practice may prefer.

In Figure 7 I illustrate another embodiment of my invention wherein the inner marginal portion of the annular member 36' is provided therearound with a series of notches 45 which upon rotation of a bolt or shank 32' under centrifugal action causes a dog or pawl 46 carried by said bolt or shank 32' to engage within one of said notches 45 and thereby effect the desired direct drive of the driven shaft.

In the further embodiment of my invention as illustrated in Figures 8, 9 and 10 the head or plate 5' has fixed thereto an externally toothed angular member 47 with which coacts a dog D' supported for rocking movement by the housing or casing A'. The dog D' has its working end formed into a toothed segment 48 which engages teeth of the member 47.

The dog D' is provided with an extension or tail 49, the inner edge 50 of which is arcuately disposed so that when the member 47 together with the housing 4' are rotating in their clockwise or normal direction, the dog D' will offer no hinderance or obstruction to such rotation. Upon retrograde or reverse rotation of the housing 4', the dog D' will swing downwardly by gravity to effect the desired mesh between the segmental gear 48 and a toothed member 47, resulting in the tail or extension 49 contacting with the top member 51, said member being preferably slidably disposed through the casing or housing A' and may be manually operated or may be operated from the reverse pedal of the engine or motor or otherwise as the requirements of practice may prefer.

The dog D' coacts with the toothed member 47 to hold the housing 4' against rotation in one direction but permits the same to have free rotation in the opposite direction. The dog D' also operates to advantage whereby the vehicle to which my improved transmission mechanism may be applied is prevented from having rearward or backward movement and paricularly in the event of engine trouble or the like.

The plate 3' of the housing 4' outwardly of the hub 53 of the disc or plate 23' is provided with the oustanding jaws or lugs 52 which are adapted to coact with the jaws or lugs 54 carried by the sliding clutch member 55. The member 55 surrounds the hub and is provided with diametrically opposed outstanding arms 56 provided adjacent their free extremities and in the outer faces thereof with the complemental cam grooves 57. The arms 56 are freely disposed through the plate or disc 23' and the plate 26', the cam grooves 57 being positioned outwardly of the plate 26'.

The plate 26' is fixed to the driven shaft S' and carries the arcuate arms or bills 39' each constructed and operating in the same manner as hereinbefore set forth relative to the arms or bills 39. As the arms or bills 39' move downwardly they coact with the cam grooves 57 to force the clutch member 55 inwardly toward the plate 3' of the casing 4' to bring the jaws or lugs 54 into locking engagement with the jaws or lugs 52 carried by the plate 3' whereby the housing 4' is locked for rotation with the shaft S'.

Each of the arms or bills 39' is mounted upon the outer end portion of the bolt or shank 32', said shank or bolt being directed through a plug or bushing 31' threaded or otherwise disposed through the plate 26'. Coacting with the shank or bolt 32' is the holding nut 58.

From the foregoing description it is thought to be obvious that a power transmission mechanism constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In a transmission mechanism, a shaft, a second shaft, one of said shafts constituting a driven shaft and the other a driving shaft, a sleeve loosely mounted on one of the shafts, a member fixed to said shaft, means operatively connecting said sleeve and the second shaft including a housing, said housing being loosely mounted on the shaft and sleeve, a gear assembly carried by the housing and coacting with the second shaft and the sleeve, coacting clutching means carried by the housing and the member, and means for bringing into action said coacting clutching means.

2. In a transmission mechanism, a shaft, a second shaft, one of said shafts constituting a driven shaft and the other a driving shaft, a sleeve loosely mounted on one of the shafts, a member fixed to said shaft, means operatively connecting said sleeve and the second shaft including a housing, said housing being loosely mounted on the shaft and sleeve, a gear assembly carried by the housing and coacting with the second shaft and the sleeve, coacting clutching means carried by the housing and the member, and means operable under the influence of centrifugal force for bringing into action said coacting clutching means, and means for regulating the action of said centrifugally operated means.

3. In a transmission mechanism, a shaft, a second shaft, one of said shafts constituting a driven shaft and the other a driving shaft, means operatively connecting said shafts including a sleeve loosely mounted on one of the shafts, a casing mounted on said sleeve and the second shaft, and a gear assembly carried by the casing and coacting with the second shaft and the sleeve, a member carried by the first shaft, means carried by the sleeve and coacting with said member for rotating the member with the sleeve, and centrifugally operated clutching means carried by said member and coacting with the casing to lock the casing for rotation with said member.

4. In a transmission mechanism, a shaft, a second shaft, one of said shafts constituting a driven shaft and the other a driving shaft, means operatively connecting said shafts including a sleeve loosely mounted on one of the shafts, a casing mounted on said sleeve and the second shaft, a gear assembly carried by the casing and coacting with the second shaft and the sleeve, a member carried by the first shaft, means carried by the sleeve and coacting with said member for rotating the member with the sleeve, a shank rotatably supported by the member, centrifugally operated means for rocking the shank, and a clutching element carried by the shank and coacting with the casing upon rotation of the shank under the action of the centrifugal means for locking the casing for rotation with the member.

5. In a transmission mechanism, a shaft, a second shaft, one of said shafts constituting a driven shaft and the other a driving shaft, means operatively connecting said shafts including a sleeve loosely mounted on one of the shafts, a casing mounted on said sleeve and the second shaft, a gear assembly carried by the casing and coacting with the second shaft and the sleeve, a member carried by the first shaft, means carried by the sleeve and coacting with said member for rotating the member with the sleeve, a shank rotatably supported by the member, a weighted member carried by the shank and moving under centrifugal force to rotate the shank, and clutching means carried by the shank for engagement with the casing under the action of said weighted member to lock the casing for rotation with the first named member.

6. In a transmission mechanism, a shaft, a second shaft, one of said shafts constituting a driven shaft and the other a driving shaft, a sleeve loosely mounted on one of the shafts, a member fixed to said shaft, means operatively connecting said sleeve and the second shaft including a housing, said housing being loosely mounted on the shaft and sleeve, a gear assembly carried by the housing and coacting with the second shaft and the sleeve, coacting clutching means carried by the housing and the member fixed to the first named shaft, and means operable under the influence of centrifugal force for bringing into action said coacting clutching means, and means for offering variable resistance to the first named means.

7. In a transmission mechanism, a shaft, a second shaft, one of said shafts constituting a driven shaft and the other a driving shaft, means operatively connecting said shafts including a sleeve loosely mounted on one of the shafts, a member fixed to said shaft, a casing mounted on said sleeve and the second shaft, a gear assembly carried by the casing and coacting with the second shaft and the sleeve and coacting with said member for rotating the member with the sleeve, a shank supported by the member, a rod carried by the shank, a weighted member slidable on the rod, means for urging the weighted member inwardly of the rod and coacting clutching means carried by the casing and member, said clutching means coming into action upon rotation of the shank in one direction.

8. In a transmission mechanism, a shaft, a second shaft, one of said shafts constituting a driven shaft and the other a driving shaft, means operatively connecting said shafts including a sleeve loosely mounted on one of the shafts, a casing mounted on said sleeve and the second shaft, a gear assembly carried by the casing and coacting with the second shaft and the sleeve, a member carried by the first shaft, means carried by the sleeve and coacting with said member for rotating the member with the sleeve, a shank supported by the member, a weighted member carried by the shank and moving under centrifugal force to rotate the shank, clutching means carried by the shank for engagement with the casing under the action of said weighted member to lock the casing for rotation with the first named member, and means for limiting the movement of the weighted member under centrifugal force.

9. In a transmission mechanism, a shaft, a second shaft, one of said shafts constituting a driven shaft, and the other a driving shaft, means operatively connecting said shafts including a sleeve loosely mounted on one of the shafts, a casing mounted on said sleeve and the second shaft, a gear assembly carried by the casing and coacting with the second shaft and the sleeve, a member carried by the sleeve and provided with an outstanding shaft, a second member fixed to the first named shaft and provided with a slot through which the shaft of the first member extends, an articulated rod connecting the shaft of the first member and the second member, a head provided with a bill engageable with the shaft of the first member, means associated with the head for rocking the same in one direction under centrifugal force, and means operated upon such rocking movement of the head to clutch together the first named member and the casing for unitary rotation.

10. In a transmission mechanism, a shaft, a second shaft, one of said shafts constituting a driven shaft and the other a driving shaft, means operatively connecting said shafts including a sleeve loosely mounted on one of the shafts, a casing mounted on said sleeve and the second shaft, a gear assembly carried by the casing and coacting with the second shaft and the sleeve, a member carried by the sleeve and provided with an outstanding shaft, a second member fixed to the first named shaft and provided with a slot through which the shaft of the first member extends, an articulated rod connecting the shaft of the first member and the second member, a head provided with a bill engageable with the shaft of the first member, means associated with the head for rocking the same in one direction under centrifugal force, means operated upon such rocking movement of the head to clutch together the first named member and the casing for unitary rotation, and means coacting with the articulated rod to limit the extent of straightening movement of said rod.

11. In a transmission mechanism, a shaft, a second shaft, one of said shafts constituting a driven shaft and the other a driving shaft, a sleeve loosely mounted on one of the shafts, a member fixed to said shaft, means operatively connecting said sleeve and the second shaft including a housing, said housing being loosely mounted on the shaft and sleeve, a gear assembly carried by the housing and coacting with the second shaft and the sleeve, coacting clutching means carried by the housing and the member, and means operable under the influence of centrifugal force for bringing into action said coacting clutching means.

12. In a transmission mechanism, a shaft, a second shaft, one of said shafts constituting a driven shaft and the other a driving shaft, a sleeve loosely mounted on one of the shafts, a member fixed to said shaft, means operatively connecting said sleeve and the second shaft including a housing, said housing being loosely mounted on the shaft and sleeve, a gear assembly carried by the housing and coacting with the second shaft and the sleeve, coacting clutching means carried by the housing and the member, means operable under the influence of centrifugal force for bringing into action said coacting clutching means, and means coacting with the housing to hold the same against rotation in one direction, said holding means offering no hindrance to the rotation of the housing in the opposite direction.

13. In a transmission mechanism, a shaft, a second shaft, one of said shafts constituting a driven shaft and the other a driving shaft, a sleeve loosely mounted on one of the shafts, a member fixed to said shaft, means operatively connecting said sleeve and the second shaft including a housing, said housing being loosely mounted on the shaft and sleeve, a gear assembly carried by the housing and coacting with the second shaft and the sleeve, coacting clutching means carried by the housing and the member, means operable under the influence of centrifugal force for bringing into action said coacting clutching means, and means automatically engaging the housing to hold the same against rotation in one direction, said holding means offering no hindrance to the rotation of the housing in the opposite direction.

14. In combination with a vehicle, a transmission mechanism comprising a shaft, a second shaft, one of said shafts constituting a driven shaft and the other a driving shaft, a sleeve loosely mounted on one of the shafts, a member fixed to said shaft, means operatively connecting said sleeve and the second shaft including a housing, a gear assembly carried by the housing and coacting with the second shaft and the sleeve, coacting clutching means carried by the housing and the member, means operable under the influence of centrifugal force for bringing into action said coacting clutching means, and means for coacting with the housing to hold the vehicle against backing movement.

In testimony whereof I hereunto affix my signature.

WILLIAM ISIAH WHEELER.